Figure 1:
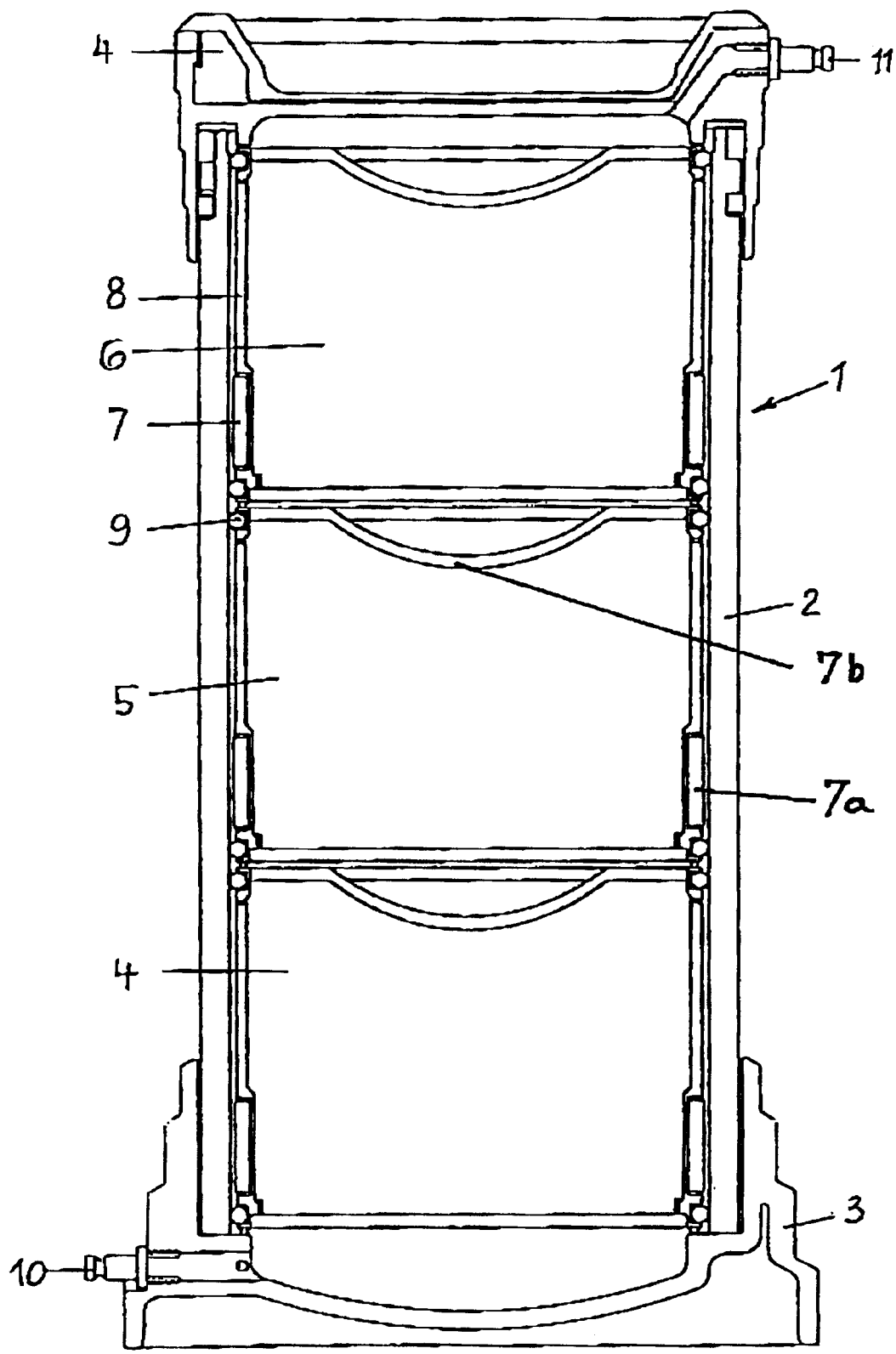

United States Patent

Bilz

[11] Patent Number: 6,120,686
[45] Date of Patent: Sep. 19, 2000

[54] WATER TREATMENT DEVICE WITH DRINKING WATER FILTER, REGENERATION DEVICE AND PROCESS FOR TREATMENT OF DRINKING WATER

[76] Inventor: Roland Bilz, Glockengasse 6, D-94034 Passau, Germany

[21] Appl. No.: 09/147,029

[22] PCT Filed: Mar. 12, 1997

[86] PCT No.: PCT/DE97/00483

§ 371 Date: Sep. 15, 1998

§ 102(e) Date: Sep. 15, 1998

[87] PCT Pub. No.: WO97/34832

PCT Pub. Date: Sep. 25, 1997

[30] Foreign Application Priority Data

Mar. 15, 1996 [DE] Germany .................. 196 10 172

[51] Int. Cl.[7] .................................................. C02F 9/00
[52] U.S. Cl. ..................... 210/266; 210/248; 210/275; 210/283; 210/284
[58] Field of Search .................. 210/248, 266, 210/269, 275, 278, 277, 282–284, 638, 669, 670, 764

[56] References Cited

U.S. PATENT DOCUMENTS

| 260,106 | 6/1882 | Long ........................................ 210/266 |
| 1,685,816 | 10/1928 | Kenney .................................... 210/269 |
| 1,698,743 | 1/1929 | Sweeney . | |
| 2,504,816 | 4/1950 | De Ville . | |
| 5,443,735 | 8/1995 | Kirnbauer et al. ....................... 210/266 |
| 5,569,380 | 10/1996 | Sullivan .................................. 210/282 |

Primary Examiner—David A. Simmons
Assistant Examiner—Frank M. Lawrence
Attorney, Agent, or Firm—Hoffman, Wasson & Gitler

[57] ABSTRACT

A filler casing houses a plurality of filter cartridges. Each cartridge has a permeable top and bottom surface and impermeable sides. Water is forced under pressure through the cartridges to accomplish filtering. Each cartridge may have a different filtering material and are removable from the casing. In this manner, the filter cartridges can be selected according to the types of impurities to be removed.

7 Claims, 15 Drawing Sheets

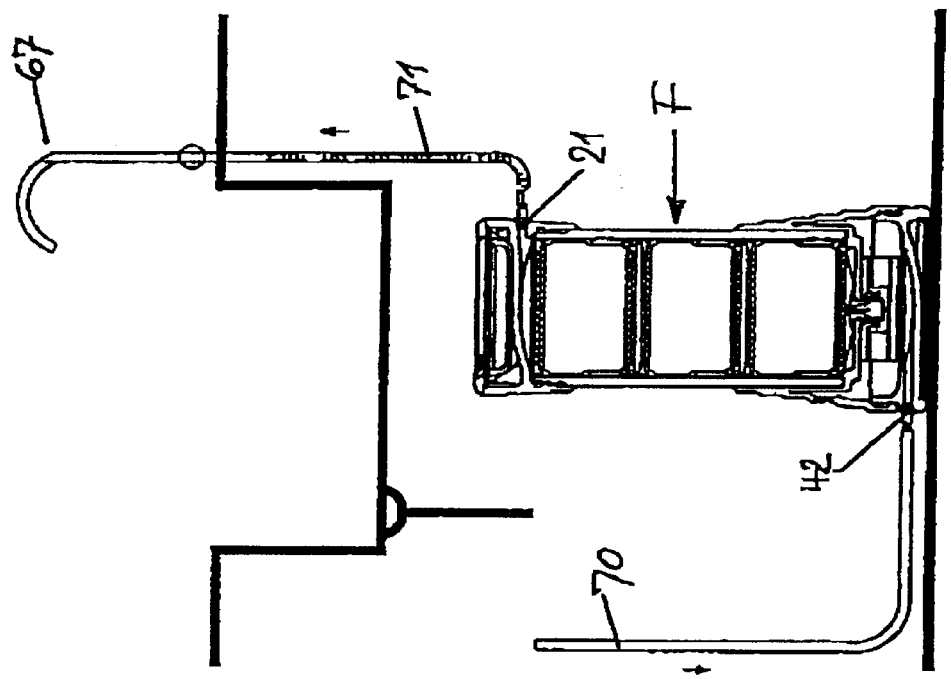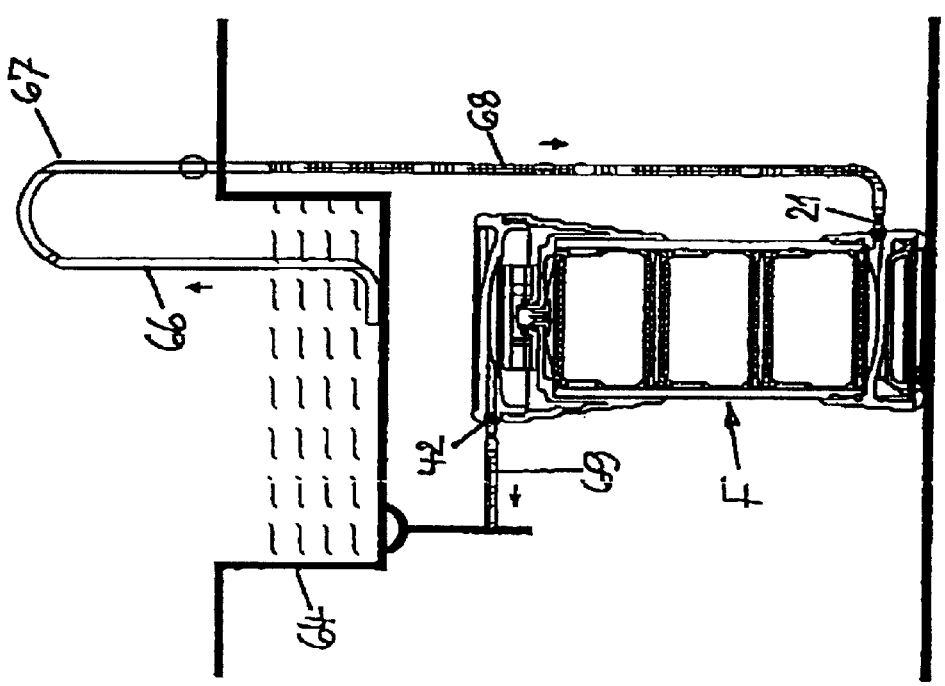

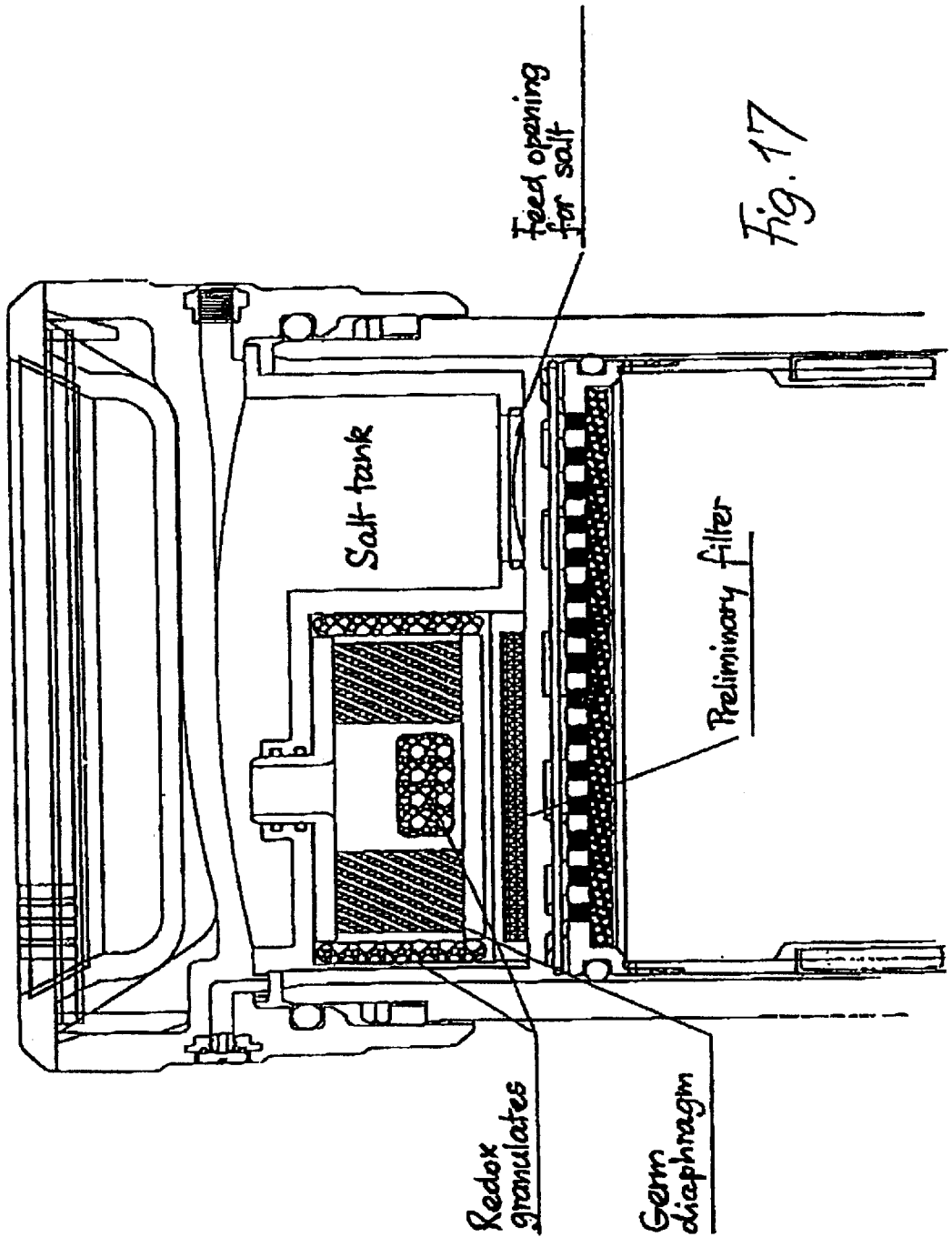

WATER TREATMENT DEVICE WITH DRINKING WATER FILTER, REGENERATION DEVICE AND PROCESS FOR TREATMENT OF DRINKING WATER

This invention refers to a water purifying apparatus for conditioning drinking water from tap water by removing pollutants, especially chloride, chlorinated carbon hydrogen, pesticides, herbicides, insecticides, heavy metals and the nitrates from tap water in order to prepare drinking water for use in the household. Especially, this invention refers to an improved embodiment of a water purifying apparatus which is the subject matter of EP 483 738 of the same Applicant.

Said known water purifying device for removing pollutants comprises a casing with lid, shell and bottom, the lid of which is provided with a water outlet, the bottom of which is provided with a pipe connection to the water inlet, and which includes activated carbon and anion exchange materials through which the tap water to be purified flows in the direction from the water inlet to the water outlet for purified water, is characterised in that the casing is provided with a lower and an upper casing section which are removable from each other, so that the interior of the casing has a first lower chamber with activated carbon and a second upper chamber with anion exchanging material, that the two chambers each are completed by filter fleeces at the top and the bottom, and that the two chambers substantially fill the complete volume of the lower and the upper casing sections.

Compared with this known apparatus, it is an object of the subject invention to improve water purifying apparatuses operated in a most simple and useful manner, and with a minimum of service with different filter media and regenerating devices, in order to obtain an extremely economic solution. Furthermore, it is an object of this invention to propose methods for purifying drinking water as well as for regenerating the filters.

With the proposal according to this invention the cartridges having identical outer dimensions and including different filter media can be assembled from prefabricated machine parts in any manner according to the filter requirements, being inserted into the cylindrical, tubelike filter casing. For inserting and removing the cartridges, it is merely necessary to remove the lid of the apparatus. The lid is formed in such a manner that if the apparatus is turned upside down it can be used as a support means. Furthermore, the lid is provided with a handle similar to each of the cartridges in order to simplify removal and insertion.

Between the individual cartridges and the filter casing a pressure balance is required. Overflow openings are provided within the cartridge casing through which overflowing water passes into the area between the cartridges and the filter casing, which area cannot be rinsed. The overflowing water is exposed to germinate. In order to oppose this procedure of germination, means are provided between cartridge and filter casing including salt in the form of tablets or salt water, which when reacting with the overflow water results in a salt solution which prevents germination and sterilizes the water. For example, one or several salt tablets can be provided at the peripheral wall of the cartridge.

According to a further embodiment of the invention, the drinking water filter in addition is provided with a germ diaphragm, by means of which germs can be filtered. The germ diaphragm is arranged within a casing which as an additional casing underneath the filter casing is connected with the filter apparatus. In order to allow an exchange of the diaphragm the germ diaphragm casing is formed in such a manner that it can be opened.

According to a further embodiment of the invention, the exchangeable filter cartridges are arranged within the filter casing in such a manner that they have a sufficiently large distance from the inner wall of the filter cases so that they can be rinsed.

In order to regenerate the drinking water filter of the water purifying apparatus, and to allow a continuous satisfactory operation, a regeneration device is provided which comprises a salt water container arranged above the filter casing or set onto the lid of the filter apparatus, a pipe connection between the salt water container and the bottom of the filter casing, and a discharge pipe connected with the top area of the filter casing, e.g. the lid. By arranging the salt water container in a high position the salt water by gravity flows downwards and pushes the salt water fluid through the cartridges within the filter casing from bottom to top. This results in regenerating the ion exchange resins, and the entire content of the drinking water filter is disinfected by the natrium solution. The salt water container can also be switched into the water circuit in such a manner that switching from normal filter mode to regeneration mode will be possible, whereby regeneration can be carried through according to the counterflow or the uniflow principle. Switching is performed by corresponding switch-over valves. For regeneration, the filter casing of the water purifying apparatus is turned upside down. Furthermore, with the subject invention the salt container for the regeneration process can be built into the water pipe and after completion of the regeneration can be separated from the water pipe. This will merely require exchanging the connections for the water nozzle and the discharge hose.

Another possibility for regeneration is to provide a separate means for pushing the salt water into the drinking water filter. Such a device comprises a casing the container of which is filled with salt water. The surface of the salt water is covered by a plate-like or box-like load so that the weight of this cover acts continuously on the salt water and thus, the salt water will be able to flow off with increasing pressure at the underside of the container over a discharge, which means that the salt water is then passed into the filter casing and flows through the filter cartridges within the filter casing from the bottom to the top. This type of device can be used in such a manner that the water purifying apparatus is arranged within the sink, whereas the container filled with salt water is arranged adjacent thereto, and at a higher level on the working surface so that, in addition to the pressure caused by the weight load the gravity of the salt water within the container is used.

Drinking water filters according to the invention can be regenerated by the consumer himself. Regeneration is required if the intake capacity of the nitrate resin is exhausted (e.g. with a nitrate load of about 100 mg/l and with a discharge amount of approx. 10 l/day regeneration subsequent to a nitrate consumption of approx. 10 mg/l is to be recommended which corresponds to a period of about eight weeks), the germ diaphragm is continuously blocked by filtering bacteria and the decrease in the through-put e.g. 2.0 l/min. is reduced to a value of e.g. 1.0 l/min., the drinking water filter is initially started, furthermore, if the cartridges or the diaphragm are exchanged.

Optimum cleaning is obtained by counterflow regeneration. Clogging by counterflow is released again and the pollutants which have been collected in the lower area of the filter materials are not passed through the entire filter mass unnecessarily. This increases the receiving capacity.

When operating in the regeneration mode the nitrate resin is cleaned from nitrate or nitride and is disinfected, if required, the activated carbon is also cleaned and disinfected, if necessary, the germ diaphragm is freed from bacteria and all other bacteria in the pre-chamber are destroyed, whereby the capacity of the through-put amount of the diaphragm, e.g. in the amount of 2.0 l/min. is recovered; all mechanical filters are cleaned and disinfected, as is also the flint layer.

Disinfecting the filter media resp. the entire filter is of special importance if the drinking water filter is used without any germ diaphragm. Subsequent to the rinsing operation with water without salt the drinking water filter is reconnected in the usual manner to the water pipe.

All materials to be used are in line with health standards and are appropriate for foodstuffs.

Figure 2:
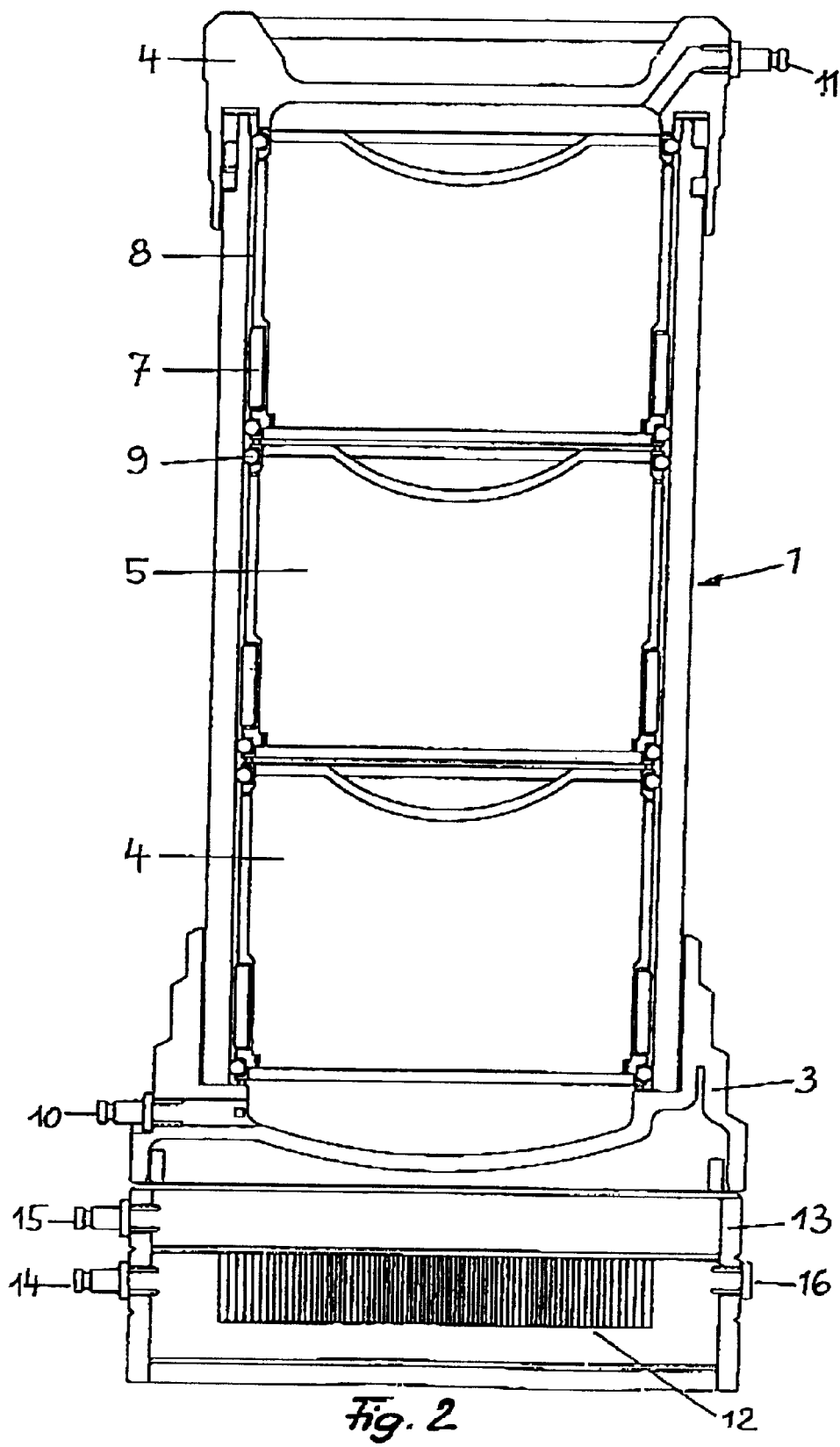
Figure 3:
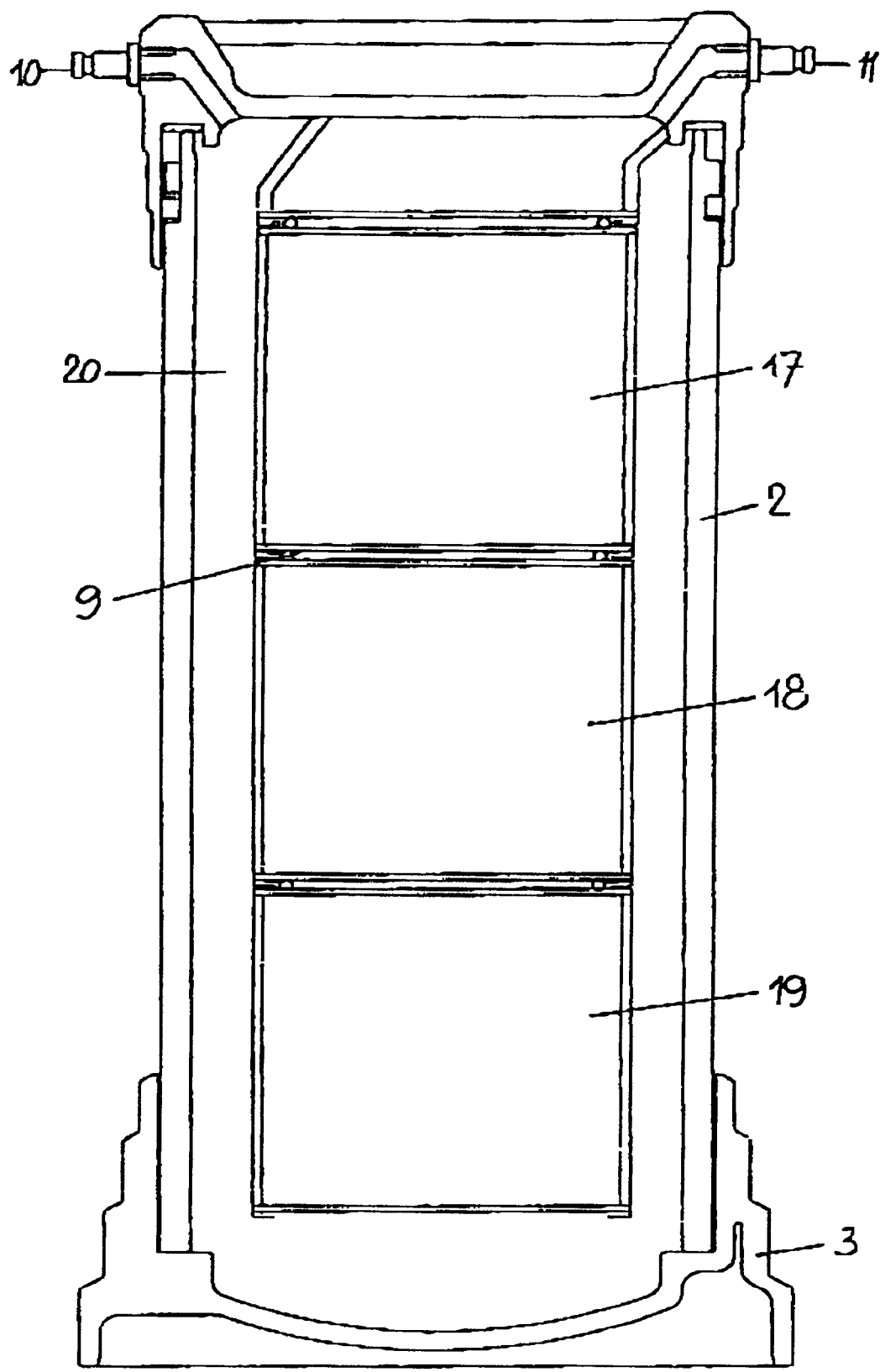
Figure 4:
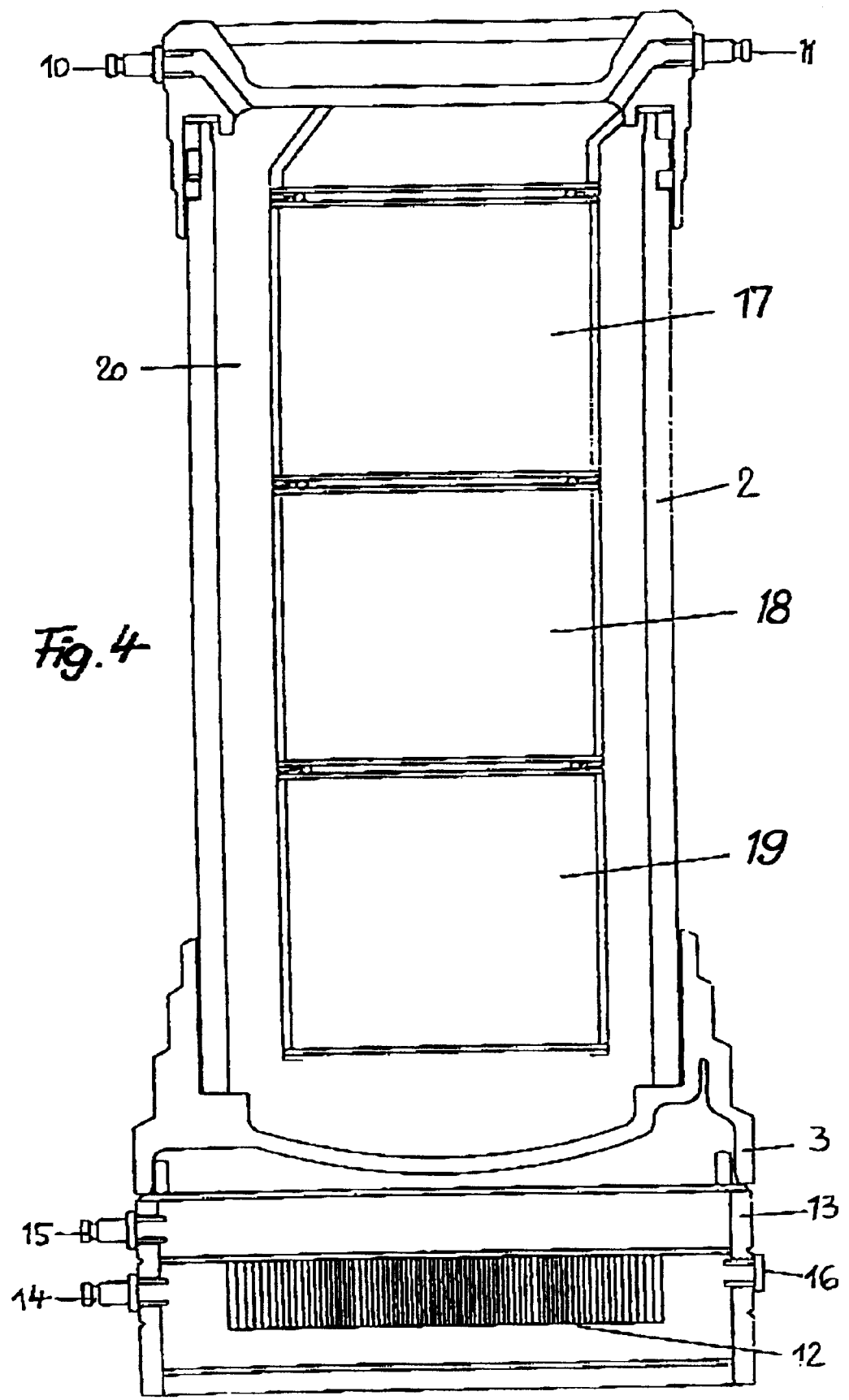
Figure 5:
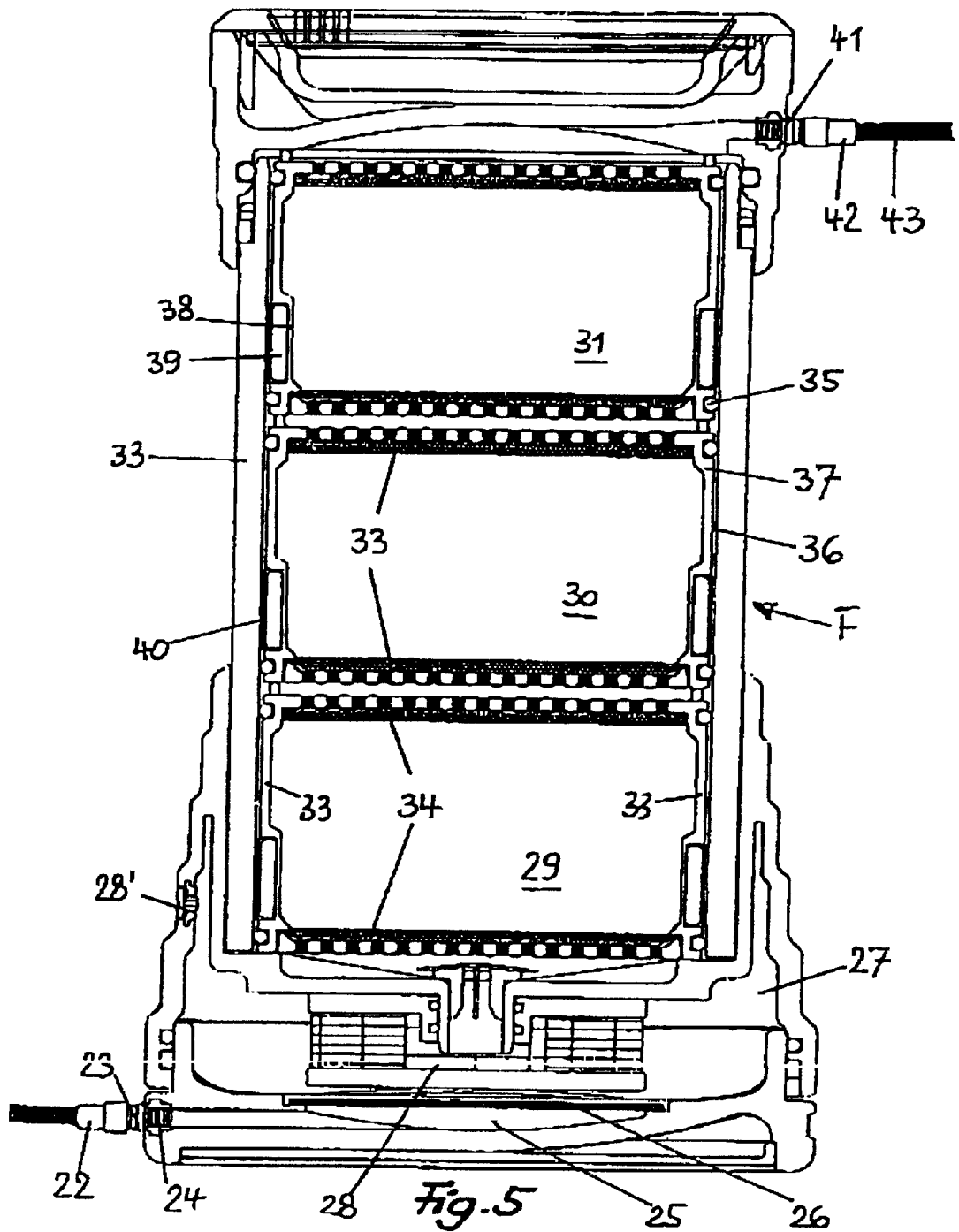
Figure 6:
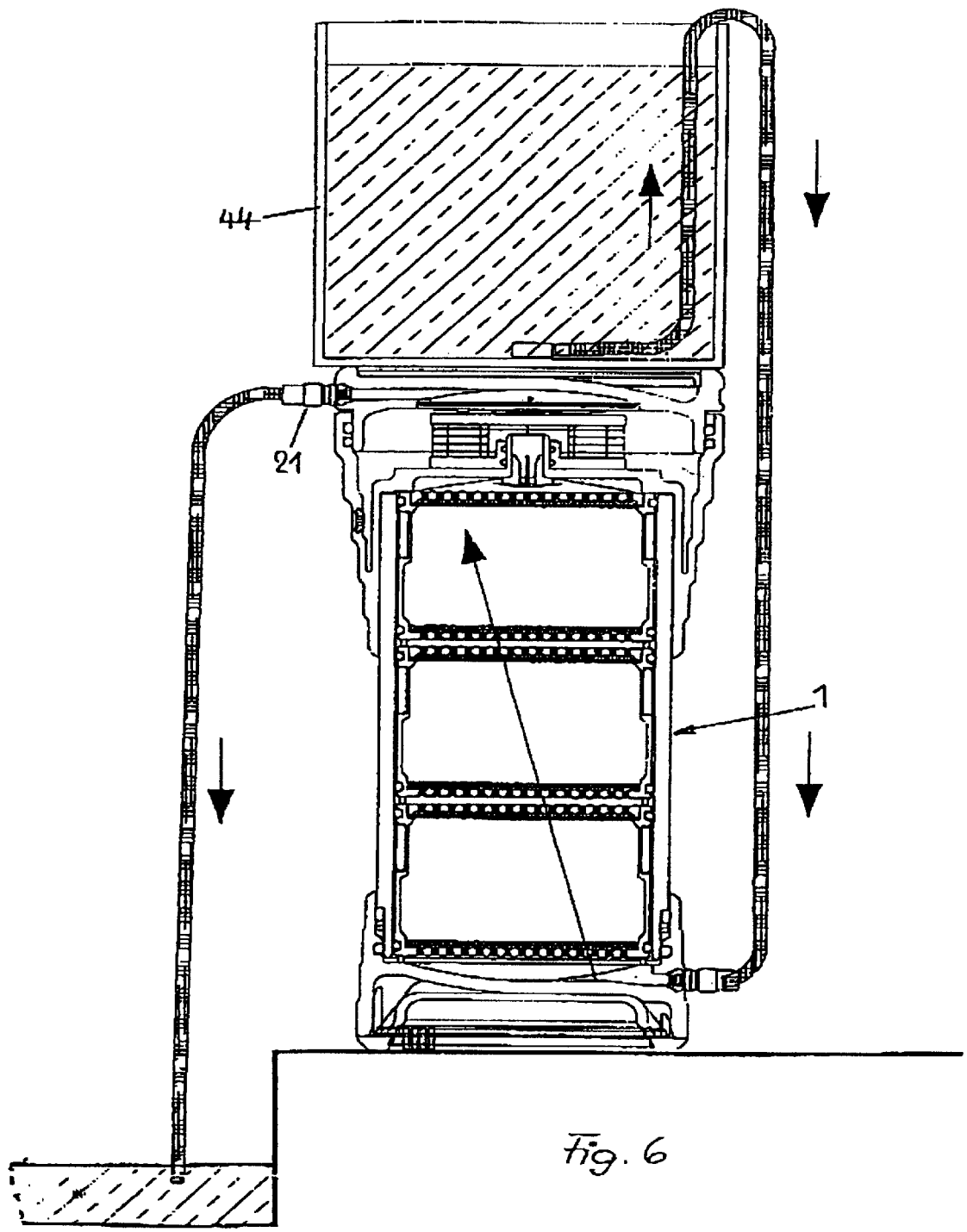
Figure 7:
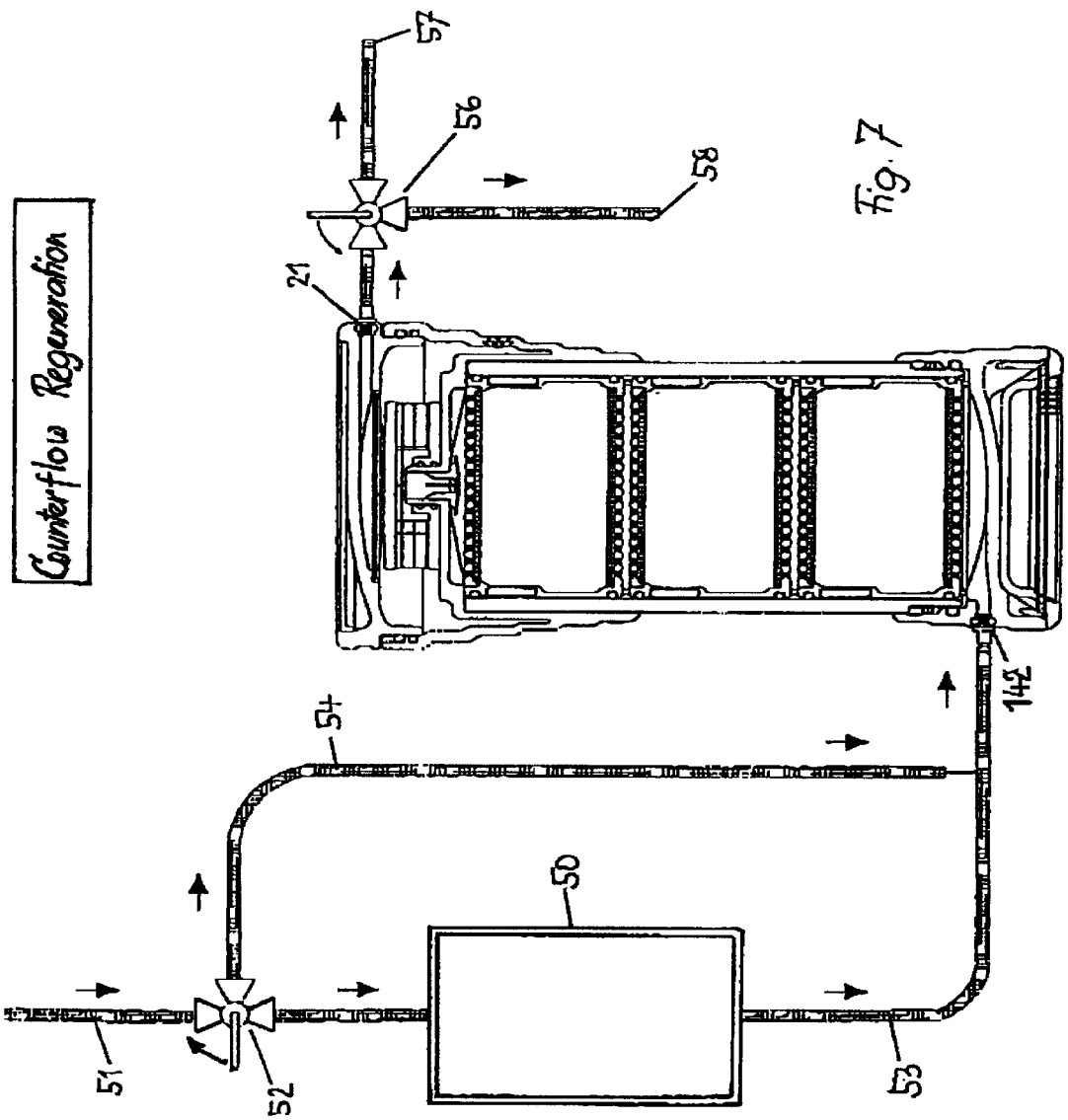
Figure 8:
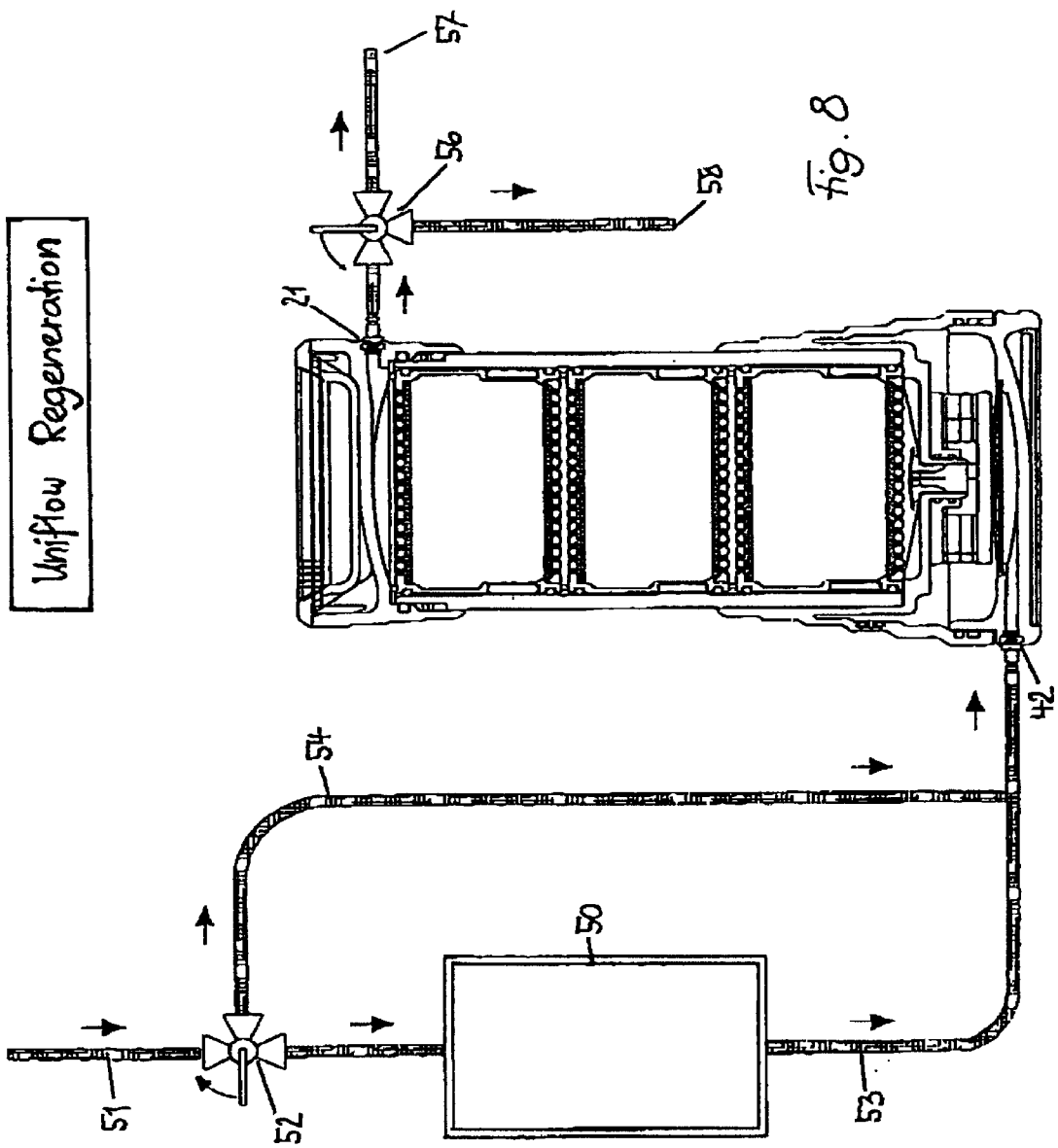
Figure 9:
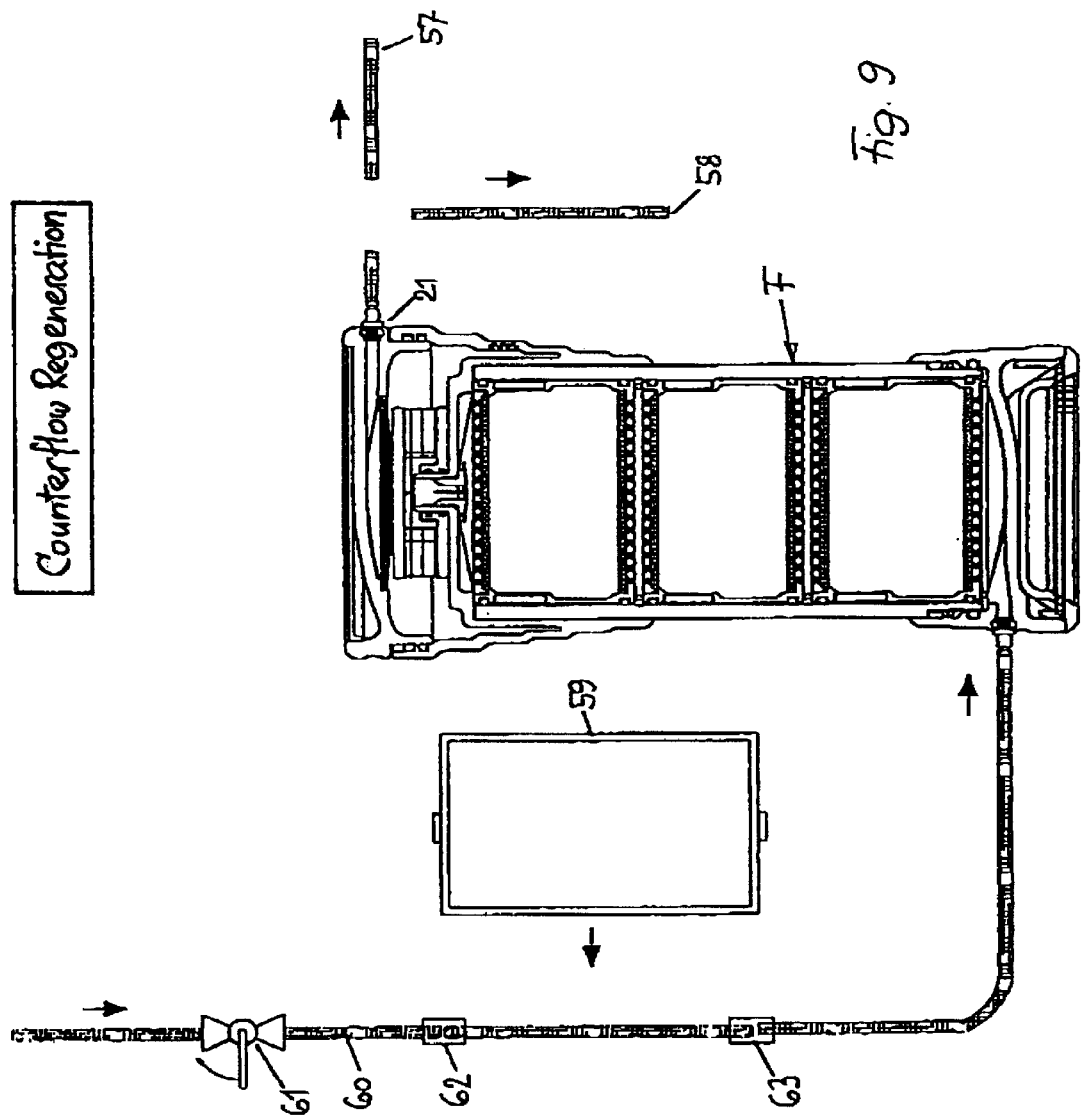
Figure 10:
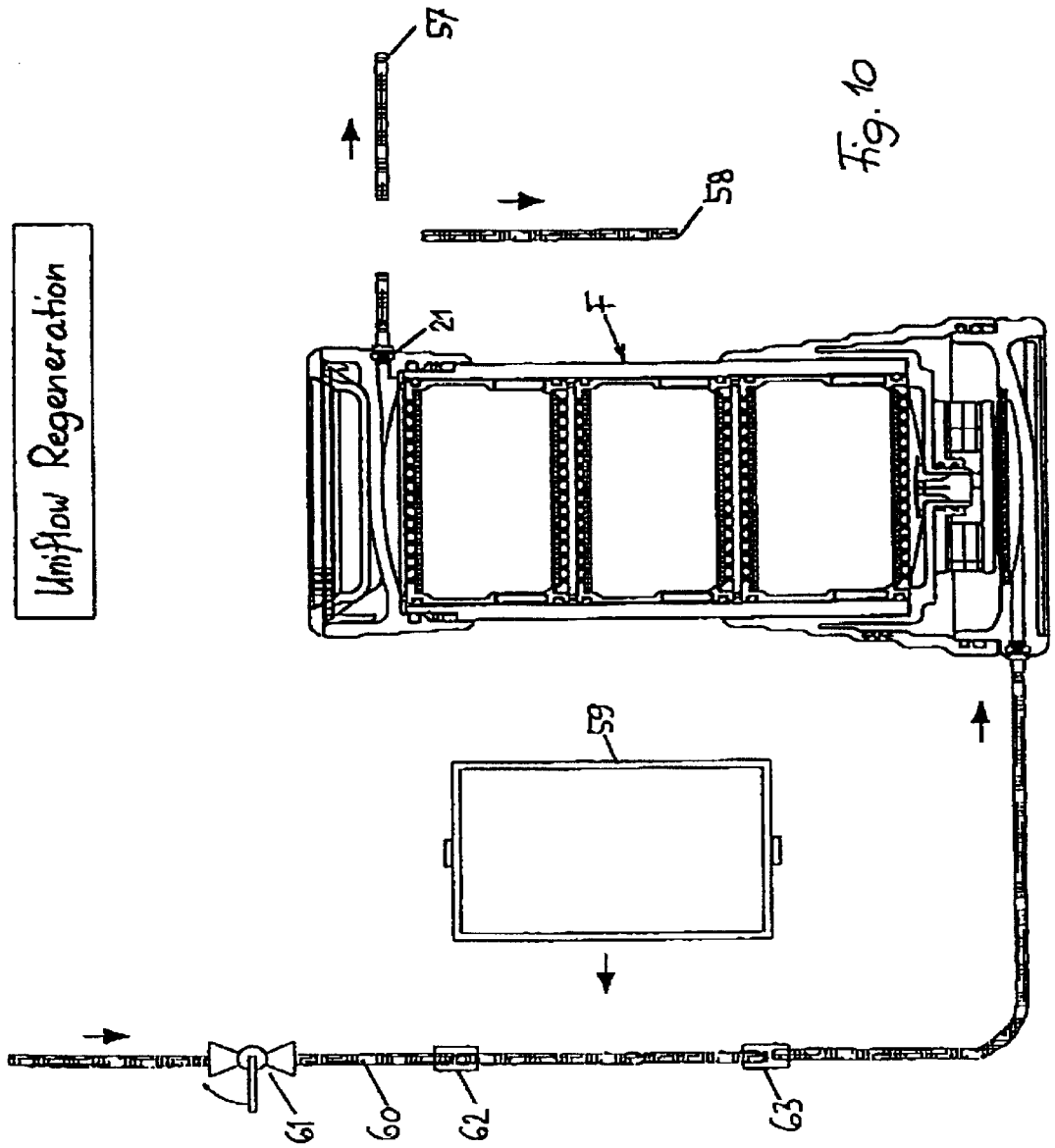
Figure 13:
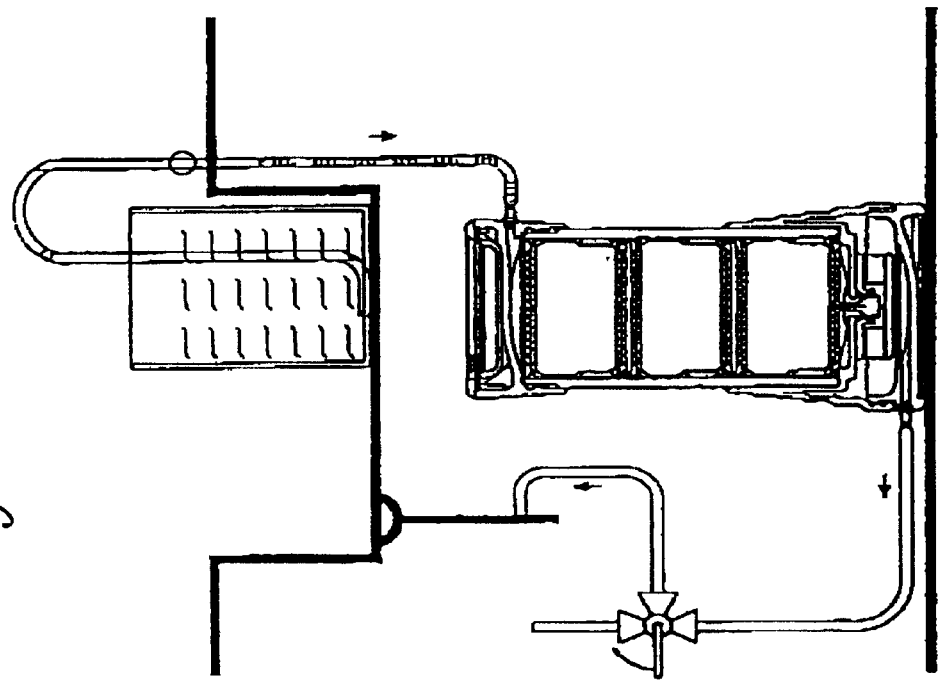
Figure 14:
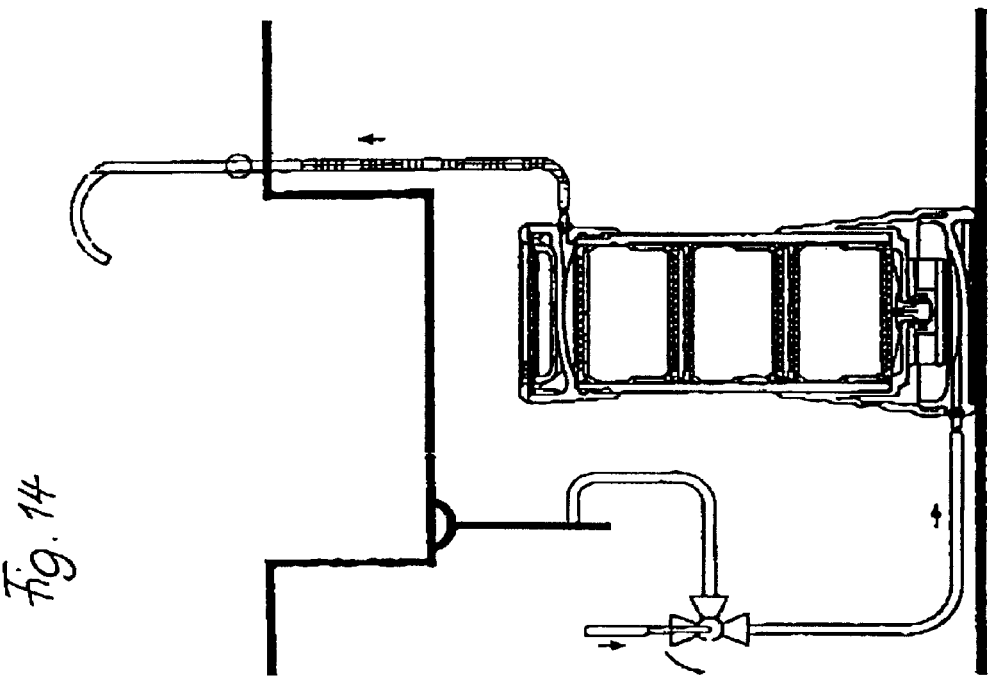
Figure 15:
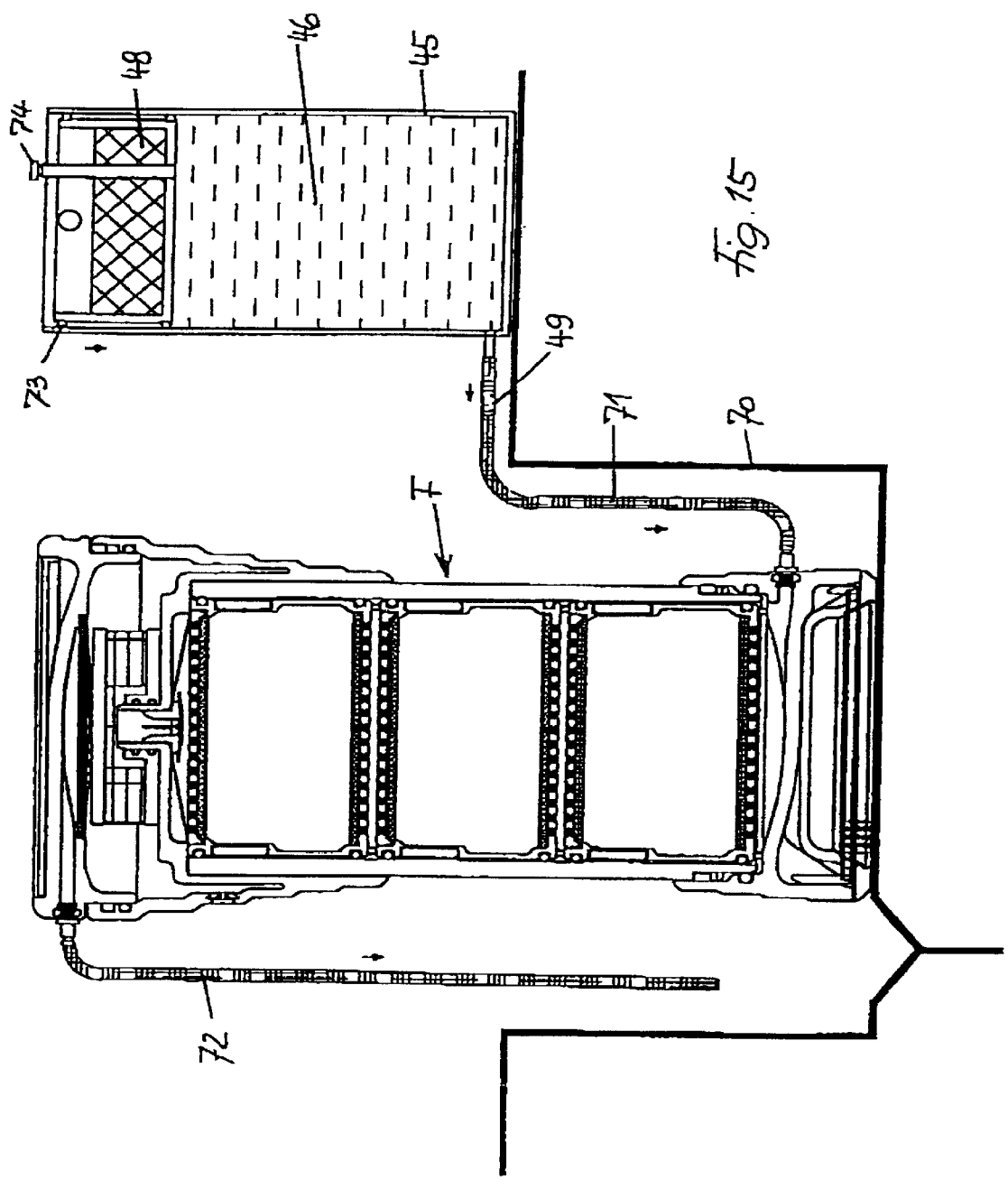
Figure 16:
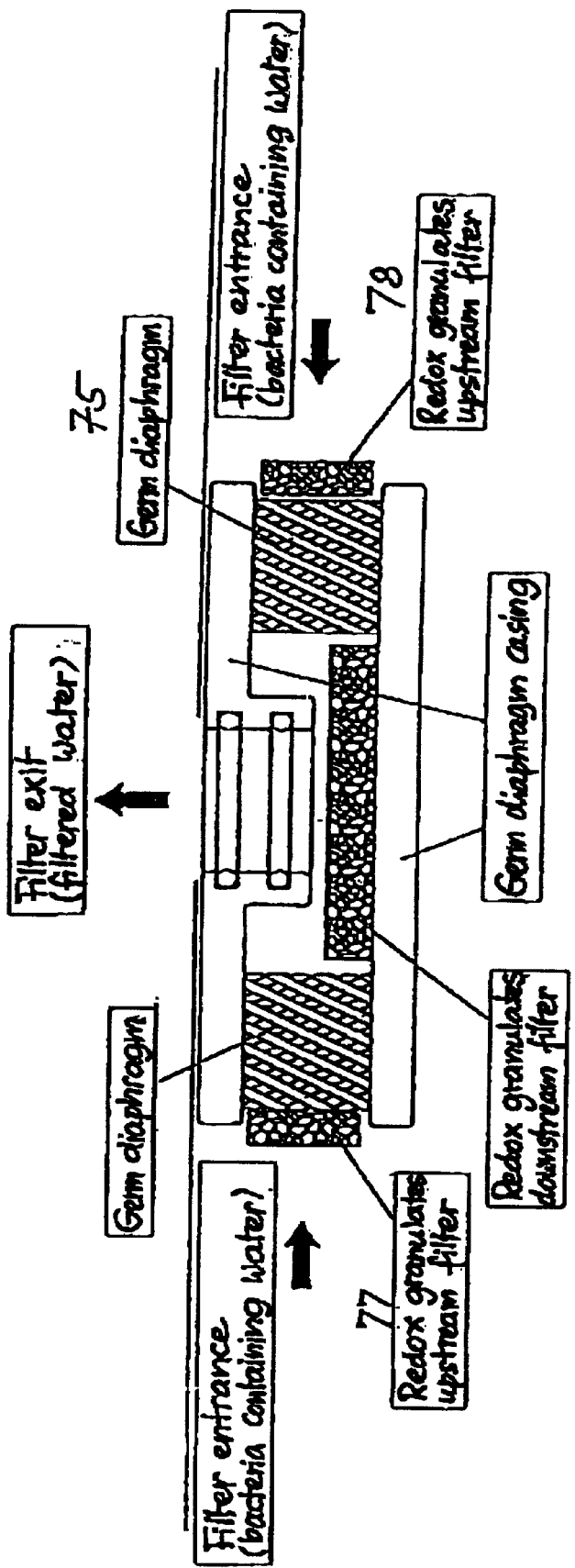

In the following the invention will be described in connection with the drawings by various embodiments. The Figures show:

FIG. 1 a cross-sectional view through an embodiment of a water purifying apparatus according to the invention, FIG. 2 a revised embodiment of the water purifying apparatus with bactericidal diaphragm, FIG. 3 a further embodiment of a water purifying apparatus according to the invention, FIG. 4 a revised embodiment of the water purifying apparatus according to FIG. 3 with bactericidal diaphragm, FIG. 5 a further embodiment of the invention with upstream bactericidal diaphragm, FIG. 6 a water purifying apparatus according to the invention in the regeneration mode with salt water container, FIG. 7 a water purifying apparatus of the invention with counterflow regeneration, FIG. 8 a water purifying apparatus according to the invention with uniflow regeneration, FIG. 9 a revised embodiment of the counterflow regeneration, FIG. 10 a revised embodiment of the uniform regeneration, FIG. 11 an undertable apparatus in the regeneration condition, FIG. 12 an undertable apparatus in the filter operation condition, FIG. 13 a revised embodiment of an undertable apparatus in the regeneration condition, FIG. 14 a revised embodiment of an undertable apparatus in the filter mode condition, FIG. 15 a water purifying apparatus according to the invention in the counterflow regeneration mode with pressure container, FIG. 16 an additional variety of purifying water according to the invention in the surroundings of the bactericidal diaphragm, and FIG. 17 the variation according to FIG. 16 integrated in a water purifying apparatus according to the invention.

The entire water purifying apparatus is marked with 1. In a cylindrical, tubelike casing 2 with bottom 3 and removable lid 4 exchangable filter cartridges 5, 6, 6a are arranged one above the other. These cartridges are of identical shape and dimensions so that they can be exchanged. Between filter casing 2 and cartridges 5, 6, 6a salt tablets 7 are arranged e.g. in recesses of the cartridges, which tablets within the space between filter casing and cartridges 5, 6, 6a are in contact with water 8 overflowing the cartridges, and are dissolved. The resulting salt solution prevents germination of the overflowing water so that the water remains free of bacteria. The cartridges 5, 6, 6a are sealed by seal rings 9, both in the upper and in the lower area against the filter casing 2. The water to be purified enters through an inlet 10 at the bottom 3, flows through the filter cartridges 5, 6, 6a from bottom to top, and exist the apparatus through the outlet 11. The cartridges 5, 6, 6a, are provided with handles 7b in order to be able to insert and remove the cartridges from the filtering apparatus.

The filter apparatus according to FIG. 2 is basically similar to that of FIG. 1, however, in addition includes a germ diaphragm 12 within a casing 13, which is arranged underneath the bottom 3 of the filter casing 2, and has an inlet 14, an outlet 15 and a vent 16. The germ diaphragm casing 13 can be removed from the filter casing 2 and can be opened for changing the germ diaphragm 12.

With the embodiment of filter 1 according to FIG. 3 between the filter cartridges 17, 18, 19 and the filter casing 2 a flow channel 20 is provided, through which the cartridges can be rinsed. FIG. 4 shows the filter casing 2 of FIG. 3 in combination with a germ diaphragm casing according to FIG. 2.

With the embodiment according to FIG. 5 drinking water flows through a feed-in hose 21, a junction coupling 22 and a inlet plug-in portion 23 in the bottom area into the filter casing F. The amount of inlet water is reduced by a volume reduction means 24 to a maximum value of e.g. 2.0 l/min. Within the inlet chamber 25 the drinking water is prefiltered by a layer of silica, whereby coarse suspended particles are removed. Subsequent thereto the water flows through a suspended particle filter 26, which is made e.g. of plastic fiber wool, and will be cleaned again. The prefiltered water passes into a prechamber 27 in which a germ diaphragm 28 e.g. a Sartopran-PH distributed by Messrs. Sartorius, Germany with mini-filter means or the like holds back all germs or bacteria within the drinking water and filters them, before the water is able to flow into the main chamber. Air which may be provided within the prechamber 27 is removed by a ventilation screw 28'. The drinking water which in this manner is free from suspended particles and bacteria subsequent thereto, is passed into the main chamber by series-connected cartridges 29, 30, 31, each of which according to the required or necessary degree of purification is filled with different filter materials, e.g. activated carbon for the absorption and absorption of plant protective means and the like, or with selective nitrate resin for removing nitrate and nitride. Preferably, all filter materials are provided with silver granulars which can be regenerated; the amount of such granular is chosen so that no silver will be discharged into the drinking water. The drinking water filter, therefore, can also be used in surroundings in which germ diaphragms can be dispensed with.

The individual cartridges 29, 30, 31 are cylinder-type containers which at the bottom and the top are open by permeable plastic grids 33. The lateral walls of the cartridges are impermeable. Rinsing the filter materials is prevented by using suspended particle filters 34 in the form of plastic fiber wool. Said filters are designed so that they compensate volume changes of the filter materials. The cartridge containers 29, 30, 31 are sealed at their lateral walls 35 towards the casing wall by rubber seals 35a so that an intermediate volume 36 is formed. Before starting the operation of a drinking water filter, the pressure within the entire container and the intermediate space 36 is atmospheric pressure. If the drinking water filter is connected to the water supply pipe, during the filling step the pressure in the container is increased up to e.g. 6 bar. For pressure balance in the intermediate space 36, the cartridges 29, 30, 31 are provided with pressure compensating apertures 37. In view of the overpressure no water flows into the intermediate space 36 above an amount of maximum 80 ml. In order to effectively prevent the growing of germs in the intermediate spaces 36, pockets 38 are provided on the outer wall 35 of the cartridges, which pockets are provided for receiving salt tablets 39. Said salt tablets 39 are covered by a plastic grid 40, however, dissolve when being in contact with water within the intermediate space until a saturation value of approx. 10 g has been obtained. The resulting salt solution prevents the growing of bacteria in the intermediate space 36. In the usual mode of operation there is no substantial pressure difference between the container and the intermediate space 36.

If the drinking water has flowed through the three cartridges 29, 30, 31 from the bottom to the top, it flows through an exit plug-in member 41, a junction coupling 42, and a connection hose 43 to the exit fitting. In this way, the filter operation is completed. The lid of the drinking water container can be opened by a bayonet catch so that the filter cartridges can be inserted into the drinking water container very easily, or alternatively the cartridges can be exchanged in a simple manner. The bottom can also be opened in order to substitute the germ diaphragms or suspension filters.

FIG. 6 shows a device for regenerating the drinking water filter of the water purifying apparatus 1. The drinking water filter is separated from the water connection pipes 21, 43 by means of junction couplings 22 and 42 and is turned upside down. The supply hose 43 is attached to the plug-in member 42 of the salt container 44. The through-put water amount is restricted by a reduction means to approx. 0.3 l/min. The connection hose 43 of the salt container 44 is connected to the exit plug-in element 41. The regenerating hose 21 is connected with the inlet plug-in member 22 at the lid and is passed into the discharge channel. As soon as the salt container is filled with ordinary cooking salt, the regeneration operation can be performed. The salt water within the container 44 is used for regenerating the ion exchange resins provided within the filter cartridges 29, 30, 31. Via the hose 43 the salt solution flows through the inlet 41 of the lid, which now is the bottom, through the individual cartridges and through the entire filter casing upwardly. At the bottom 47, which is now the lid, the salt water flows via hose 21 through the exit 22, which otherwise is the inlet.

A further embodiment of a regeneration system is shown in FIGS. 7 and 8. FIG. 7 shows a counterflow-regeneration system, FIG. 8 a uniflow-regeneration system. The filter casing F is similar to that in FIG. 5. A salt water container 50 is switched into the path of the water pipe 51. Upstream a switching valve 52 is provided which in the filter mode passes the water flow via pipe 54 into the inlet 142 of the filter casing F, whereas in the regeneration mode the switching valve 52 locks the flow into pipe 54 and allows the flow into pipe 53 so that the waterstream passes through the salt water in container 50, and therefrom into inlet 42. At the outlet 21 a switching valve 56 is provided which allows the flow of water in the one position to the water valve 57 and in the other position to the exit 58. For performing the regeneration mode the filter casing is turned upside down.

With a revised embodiment of a regeneration system according to FIGS. 9 and 10 the salt water container 59 is connected to the water pipe 60 for the regeneration mode only; 61 is a shut-off valve, 62 and 63 are the connection points for receiving the salt water container 59. When switching over from filter mode to regeneration mode the water valve and the discharge hose at the output 21 of the filter casing F are merely reversed.

With an undertable structure of the filter system according to FIGS. 11 and 12 the filter casing F is arranged underneath the sink 64. In the regeneration mode the sink 64 is filled with salt water 65. A hose 66 extends from the bottom of the sink 64 to the exit valve 67 and through a pipe 68 with the exit 21 of the lid of the filter casing. The salt water 65 flows through pipe 68 and into the filter casing F, through the cartridges from the bottom to the top (with a filter apparatus turned upsidedown), and from the inlet 42 which now acts as an exit, through a hose 69 into the sewage channel. In the filter mode according to FIG. 12 the filter apparatus is operated in the usual manner, which means that tap water is passed into the filter casing F through pipe 70 and inlet 42 into the filter casing F, through the cartridges upwardly and at the outlet 21 via the connection pipe 71 to the outlet valve 67, where the filtered water can be discharged.

FIGS. 13 and 14 show the operation of the filter system in the regeneration condition and in the filter operating condition, whereby in the regeneration condition and in the counterflow-regeneration operation a container filled with salt water is arranged within the flushing basin, and the salt water is discharged from the filter system by means of a shutoff valve into the sewer, whereas in the filter operation the supplied water is passed from the water conduit via the shutoff valve into the bottom of the filter system and can be removed as purified water at the flushing basin.

A further embodiment of a counterflow-regeneration is shown in FIG. 15. The filter apparatus F is arranged within the sink 70. A container 45 including salt water 46 is arranged on a table plate. Upon the surface of the salt water volume 46 a casing 47 is floatingly arranged, which is provided with a load 48 so that pressure is exerted onto the salt water volume 46. At the outlet 49 the salt water is supplied through a hose 71 into the filter casing F and is urged through individual filter cartridges, and subsequent thereto at the top (with the filter casing turned upside down) is passed into the sewer through a hose 72. The casing 47 within container 45 is designed according to a float, is arranged movable in height within container 45, and also is sealed against the wall of the container by means of rubber rings 73. Furthermore, casing 47 includes a venting tube 74.

For filtering and extracting bacteria and micro-organisms provided within the raw water the water purifying apparatus according to the invention is provided with a bactericidal diaphragm. As basically shown in FIG. 16, at the outer side of such bactericidal diaphragm 75, namely at the filter input, the bacteria will accumulate. Said bacteria are destroyed by common salt during regeneration, and are flushed out from the drinking water filter casing again. Such regeneration will normally be carried through only every 4–8 weeks. Between said regenerations bacteria can grow through the bactericidal diaphragm so that behind the diaphragm an area free of germs can no longer be guaranteed. In order to prevent such growing through the bacteria extracted at the bactericidal diaphragm are to be killed as soon as possible, at least within three days. For this purpose a mixture of example from copper and zinc in the form of so-called redox granules is inserted into the bactericidal membrane 75 downstream of the filter and in front of the bactericidal diaphragm upstream of the filter, as shown with 77 and 78. With a redox reaction an electrolytical current is generated similar to a battery. The very low voltage obtained therein causes that the bacteria adhering to the bactericidal diaphragm 75 will be destroyed. Therefore, the bacteria can no longer grow through the membrane. The process of destroying bacteria is improved by additional chemical reactions. As practice has shown, negative results of the water to be filtered cannot be made out subsequent to this operation.

FIG. 17 shows the basic system shown in FIG. 16 built into a water purifying apparatus according to the invention.

What is claimed is:

1. Apparatus for conditioning drinking water from tap water by removing disinfective materials, comprising
    a cylindrical casing with a lid, a peripheral wall and a bottom,
    a water input and a water outlet,
    filtering materials which are arranged in sections of the casing arranged one above the other, and the tap water to be purified is passed through the sections,
    whereby,
    a) the different sections of the casing being designed as separate filter cartridges, which are independent and are exchangeable one against the other, and which in the form of construction kits are combined within the device dependent on the disinfective materials included within the tap water to be conditioned, and which are to be removed,
    b) the individual cartridges are perforated on the bottom and the top side for vertical water flow, whereas the peripheral surfaces of the cartridges are impermeable for water,
    c) the tap water being passed under pressure at the bottom of the device, being urged from the bottom to the top through the individual filter cartridges in a substantial vertical direction, and being removed at the upper part namely the lid, and
    d) germ killing material arranged in the form of salt tablets, inserted withing recesses formed at the peripherally outer sides of the cartridges.

2. Apparatus according to claim 1, wherein a small annular gap is formed between the peripheral surfaces of the cartridges and the interior wall of the casing, pressure balance overflow apertures are provided between the cartridges and filter casings, sealings are positioned at the upper and at the lower end of the filter cartridges and the germ killing material is located on the outer side of the cartridge peripheral wall are contacted by water overflowing the cartridges.

3. Apparatus according to claim 1, wherein the drinking water filter comprises a germ membrane which is located in a germ membrane casing at the bottom of the apparatus, and is removably arranged.

4. Apparatus according to claim 1, wherein the drinking water filter comprises a germ membrane which is located in a germ membrane casing within the lid of the apparatus and is removably arranged.

5. Apparatus according to claim 3, wherein within a germ membrane downstream of the filter and before a germ membrane upstream of a filter bacteria killing material, namely a mixture of copper and zinc of Redox-granulates is provided.

6. Apparatus according to claim 1, wherein the lid of the filter casing is removable from the apparatus, the cartridges arranged one above the other are removable from the filter casing, each of the cartridges is provided with a handle for lifting the cartridge out of the filter casing, and the bottom and the top surfaces of each cartridge are provided with a liquid-permeable grid of plastic material.

7. Apparatus according to claim 1, wherein a salt water container is associated to the filter casing, from which the salt water for regeneration purposes is passed into the filter casing at the bottom and is discharged from the filter casing so that the salt water is passed through the filter casing and through the cartridges in a counterflow process, whereby for carrying through the regeneration step the filter casing is turned upside-down.

* * * * *